Nov. 11, 1952 R. L. GRUEN Des.-Re. 23,573

TRAY OR SIMILAR ARTICLE

Original Filed Nov. 15, 1951

INVENTOR
Robert L. Gruen
BY
Dean Fairbank & Hirsch
ATTORNEYS

Reissued Nov. 11, 1952

Des.-Re. 23,573

UNITED STATES PATENT OFFICE 23,573

TRAY OR SIMILAR ARTICLE

Robert L. Gruen, New York, N. Y., assignor to Continental Silver Co. Inc., a corporation of New York Original No. 167,206, dated July 8, 1952, Serial No. 17,424, November 15, 1951. Application for reissue August 8, 1952, Serial No. 20,959

1 Claim. (Cl. D44—10)

Figure 1:
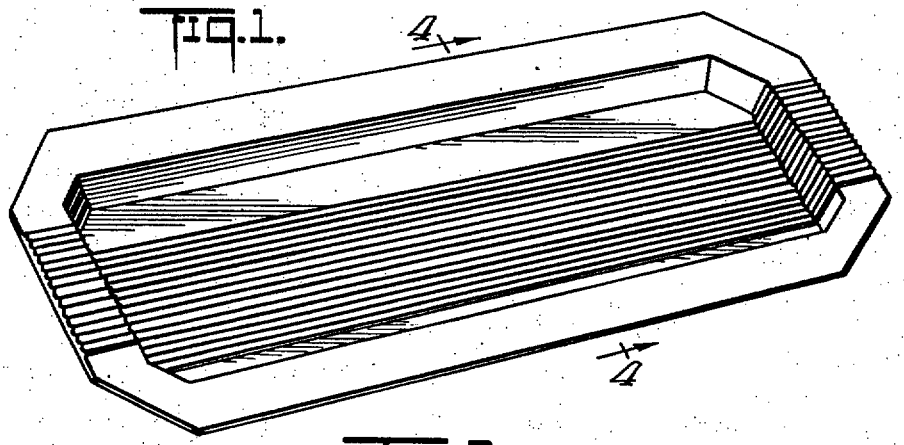
Figure 2:
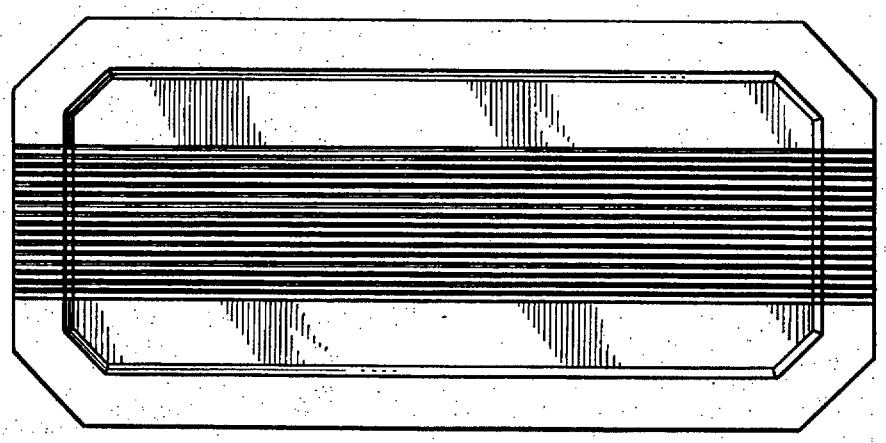
Figure 3:
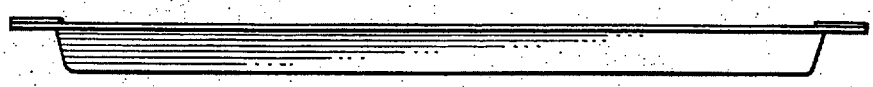
Figure 4:
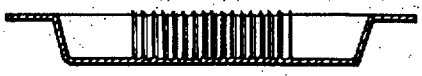

To all whom it may concern:

Be it known that I, Robert L. Gruen, a citizen of the United States and residing at New York, in the county of New York and State of New York, have invented a new, original, and ornamental Design for Tray of Similar Article, of which the following is a specification, reference being had to the accompanying drawings, forming part thereof, and in which Fig. 1 is a perspective view of a tray or similar article, showing my new design, Fig. 2 is a top plan view, Fig. 3 is a side elevational view, and Fig. 4 is a transverse vertical sectional view thereof, taken along line 4—4 of Fig. 1.

The dominant feature of my design resides in the grooved inlay ornamentation placed along the longitudinal axis of the tray, as shown.

I claim:

The ornamental design for a tray or similar article, substantially as shown and described.

ROBERT L. GRUEN.

REFERENCES CITED

The following references are of record in the file of this patent or the original patent:

UNITED STATES PATENTS

| Number | Name | Date |
|---|---|---|
| D. 98,317 | Guild | Jan. 28, 1936 |
| D. 101,861 | Ebeling | Nov. 10, 1936 |
| D. 160,559 | Spence | Oct. 17, 1950 |

OTHER REFERENCES

Mogi, Momonoi Illustrated Catalog of Japanese Goods (Atlas), rec'd May 29, 1935, Plate 1560–M, items 55/1068 and 55/1061.

Gift and Art Buyer, March 1940, page 3, "Evercraft's" cream and sugar.

Manning-Bowman Leaflet, rec'd May 14, 1936, The Buffetter Toaster Service Trays.